United States Patent [19]

Ando et al.

[11] Patent Number: 4,882,002

[45] Date of Patent: Nov. 21, 1989

[54] PROCESS OF MANUFACTURING A COMPOSITE PANEL FOR SHOCK ABSORPTION

[75] Inventors: Yoshio Ando, Kawagoe; Yoshiki Ishige, Tokorozawa; Toshiyuki Kinugasa, Hidaka; Shoji Sato, Tokorozawa, all of Japan

[73] Assignee: Honda Giken Kabushiki Kaisha, Tokyo, Japan

[21] Appl. No.: 208,091

[22] Filed: Apr. 13, 1988

[30] Foreign Application Priority Data

Jun. 29, 1978 [JP] Japan ................................. 53-78021
Jun. 29, 1978 [JP] Japan ................................. 53-78022
Jun. 29, 1978 [JP] Japan ................................. 53-78023

[51] Int. Cl.$^4$ ............................................. B32B 7/00
[52] U.S. Cl. ..................................... 156/310; 156/182; 156/196; 156/212; 156/214; 156/228; 156/307.5; 156/320; 156/322; 156/331.4; 156/332; 180/90; 280/752; 296/70; 428/174; 428/317.7; 428/319.7; 428/420

[58] Field of Search ............... 156/310, 228, 182, 315, 156/196, 320, 212, 322, 214, 332, 307.5, 331.4; 427/379; 428/174, 482, 420, 317.7, 319.7; 180/90; 296/70; 280/752

[56] References Cited

U.S. PATENT DOCUMENTS 3,231,443 1/1966 McNulty ............................ 156/310

FOREIGN PATENT DOCUMENTS 1342600 1/1974 United Kingdom ................ 156/212

Primary Examiner—John J. Gallagher
Attorney, Agent, or Firm—Armstrong, Nikaido, Marmelstein, Kubovcik & Murray

[57] ABSTRACT

A process for manufacturing a composite panel capable of shock absorption comprising applying a bonding agent with an added cross-linking agent on a surface of a foam member to form a primer treatment surface thereon and applying to a surface of a laminating member the same or a similar bonding agent with added cross-linking agent. The treated surfaces of the foam member and laminating member are then placed into contact with one another and the two members are bonded together while heating the same and applying pressure thereto.

1 Claim, 2 Drawing Sheets

PROCESS OF MANUFACTURING A COMPOSITE PANEL FOR SHOCK ABSORPTION

This is a continuation of application serial no. 06/052,223 filed June 26, 1979, now abandoned.

FIELD OF THE INVENTION

This invention relates to a process of manufacturing a composite panel capable of shock absorption and having a foam layer for use an an instrument panel for a motorcar or the like.

PRIOR ART

Hitherto known is a manufacturing process for a panel of this type in which a laminating member is placed in a mold, and a foaming resin liquid is introduced into the mold and is foamed in situ or a previously molded foam member is adhered to the laminating member. The product obtained by either of these conventional manufacturing processes, however, is disadvantageous in that, because the foam member is adhered directly to the laminating member, the bonding strength therebetwen is low and the two members tend to be easily separated.

There has been also adopted a process for increasing the bonding strength in that the mutually facing surfaces of the two members to be bonded together are previously subjected to an oxidation treatment with an oxidizing agent or they ar subjected to a physical treatment such as sanding. However, good results have not been obtained.

There has been also known a process in which polyolefin resin powders are spread over the respective surfaces to be adhered together, and these powders are melted to bond the surfaces together. However, there has not been obtained a sufficient bonding strength. Further, even if a cross-linking type bonding agent comprising any desired bonding agent with an added cross-linking agent is melted and then bonding under pressure is carried out, there is the disadvantage that the bond between the two members may be insufficient for the reasons that, for instance, the wetting or affinity of the molten bonding agent in relation to the foam member, such as a polyolefin foam member of the like, is low, and additionally the foam member surface may be rough.

SUMMARY OF THE INVENTION

An object of the invention is to provide a manufacturing process by which the foregoing disadvantages can be overcome and a composite panel can be obtained comprising a foam member and a laminating member which are bonded together extremely tightly.

In accordance with the invention a foam member is previously given to its surface to be bonded, a primer treatment in which a hot-melting type bonding agent with an added cross-linking agent is applied thereonto and the bonding agent is hardened by the cross-linking thereof to form a primer treatment surface, and a laminating member is previously coated, on its surface to be bonded, with a cross-linking type hot-melting bonding agent, and these two members are placed upon one another and are bonded together under heat and pressure.

This process can be applied to the manufacture of an instrument panel for a motorcar or the like, and as is usual in such case, the foam member is previously provided at its reverse surface with a covering sheet adhered thereto, while the laminating member comprises a hard base member panel.

Embodiments of this invention will now be described with reference to the accompanying drawings.

DETAILED DESCRIPTION

Figure 1:
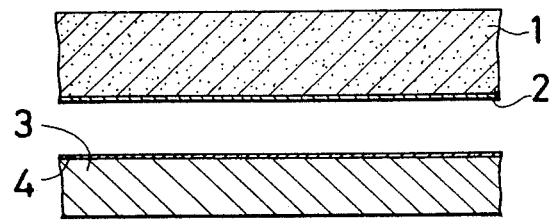
FIG. 1 is a schematic sectional view showing one embodying example of the process of this invention in a first stage thereof.
Figure 2:
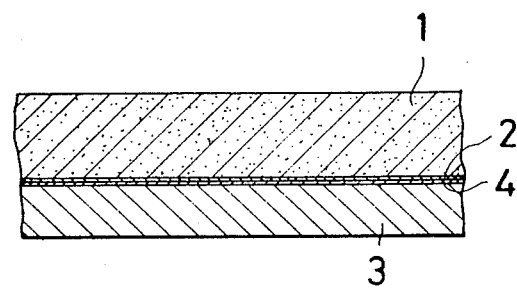
FIG. 2 shows the process in a subsequent stage thereof.

Referring to FIGS. 1 and 2 showing one embodiment of the invention, numeral 1 denotes a foam member sheet made of any polyolefin resin, such as polypropylene, polyethylene, a copolymer of ethylene and vinyl acetate, etc. The foam member sheet 1 is subjected on its surface to be bonded to a primer treatment in which a cross-linking type adhesive agent comprising, for instance, a polyester bonding agent, such as a saturated polyester or the like with an added cross-linking agent such as an isocyanate is applied thereonto and is hardened by heating to a temperature of above 150° C. until the cross-linking reaction ends completely. Thereby, the bonding agent is converted into a hardened coating film having no hot-melting property, and there is formed a primer treatment surface 2 on the foam member sheet 1. This treatment surface 2 constitutes an extremely thin primer coating film at least on the surface of the foam member sheet 1. The thickness thereof may be determined as desired.

A molded member 3 of ABS resin is prepared as a laminating member for the foam member sheet 1 e.g. polypropylene, and the surface of member 3 to be bonded to the sheet 1 is coated uniformly over its entire extent with a cross-linking type bonding agent comprising a hot-melt type bonding agent such as a polyesteer or the like with an added cross-linking agent, whereby a coated layer 4 is formed on member 3. The molded member 3 and the foam member sheet 1 are so disposed that the coated layer 4 and the primer treatment surface 2 face one another. The sheet 1 is heated to 130°–140° C., and then the two members are pressed together under heat. They are kept in this condition for a predetermined time until the tackiness of the bonding agent gradually decreases and is lost as the temperature diminishes whereby the cross-linking of the bonding agent is completed and there is obtained a composite product. The reason for adding the cross-linking agent to the hot-melting type bonding agent is that the softening temperature of the bonding agent after combining the two members together for bonding is increased and thereby the bonding strength is retained during periods of high temperature. In the case where bonding is carried out with the same type of bonding agent as that used for the primer treatment surface, the affinity between the two is heightened, and the bonding strength between the foam member sheet 1 and the laminating member 2 can be further improved.

When the resultant composite panel was subjected to a bonding strength test, the foam member sheet 1 itself failed under the tensile force and the bond between the foam member sheet 1 and the laminating member 3 remained intact.

The laminating member 3 may be made either of thermoplastic resin or thermosetting resin, and additionally the member 3 may be made of inorganic fiber board, a vegetable pulp fiber sheet or a board such as corrugated cardboard or the like. Further, the member 3 may be a simple flat plate or of any desired shaped.

DESCRIPTION OF SPECIFIC EMBODIMENTS

Example I

A polypropylene foam member sheet of 4 mm thickness is previously covered by a leather-like sheet of polyvinyl chloride of 0.5 mm thickness and is subjected, on its reverse surface, to a primer treatment in which a polyester bonding agent with an added cross-linking agent, such as an isocyanate, polyisocyanate, etc. is coated thereonto and is hardened at a temperature of 170° C. to form thereon a cross-linked hard primer coating film.

A rigid base member of ABS resin of 3 mm thickness is coated, on its surface to be bonded, with the same cross-linking type bonding agent and is dried and then heated to 50°–60° C. The foam sheet after the primer treatment is heated to 130°–140° C., and the two members are placed on one another and pressed together under a pressure of 3–5 Kg/cm$^2$, and formed into a predetermined shape and held in shaped condition so that during this time the hardening of the bonding agent is completed, whereby there is obtained a composite product, namely, a composite panel of foam type. When this product was subjected to a peeling or delamination test, the foam member itself was broken, and the bonding strength between the two members was maintained. This process may also be applied to the bonding of the leather-like sheet with the foam member sheet.

Thus, according to the invention, the surface of the foam member is subjected, in advance, to the primer treatment, and thereafter the laminating member is placed theeon and bonded thereto by pressing, so that the bonding effect between the two members is extremely improved in comparison with the method wherein the foam member is adhered under pressure directly to the laminating member simply by a bonding agent. Consequently, there is obtained a product with an improved bonding strength.

In another embodiment of the invention shown in FIGS. 3 to 6, the process is applied to the manufacture of an instrument panel for a motorcar or the like.

In this embodiment, a foam member provided with a semi-hard covering sheet and a hard base member panel are previously shaped and placed on one another and bonded together in substantially the same manner as above, so that there is obtained a composite product having high bonding strength.

Figure 3:
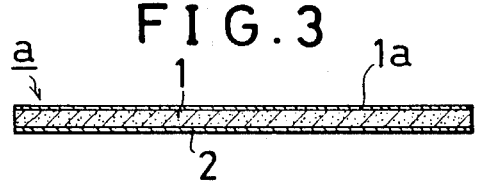
FIGS. 3 to 6 are sectional views showing another embodiment of the process of the invention.

FIG. 3 shows an upper constructional member a of the invention, and member a has a semi-hard thermoplastic synthetic leather-like covering sheet 1a adhered by a bonding agent to one surface of a polypropylene foam sheet 1, and on the other side of the sheet 1 is a primer coating of a coating agent comprising a polyester bonding agent, such as a saturated polyester or the like with an added cross-linking agent. thus, a comparatively smooth primer surface 2 is formed on sheet 1. The surface 2 may be an extremely thin filmy coating layer as illustrated. The laminate sheet a thus constructed is placed in an upper female die A shown in FIG. 5 and is shaped by vacuum shaping. In this case, the primer surface 2 is hardened by heating so as to form a primer treatment surface.

A hard base member panel 3 constituting a lower constructional member b of the invention is made of a hard synthetic resin such as ABS resin and is previously molded to a predetermined shape.

Figure 4:
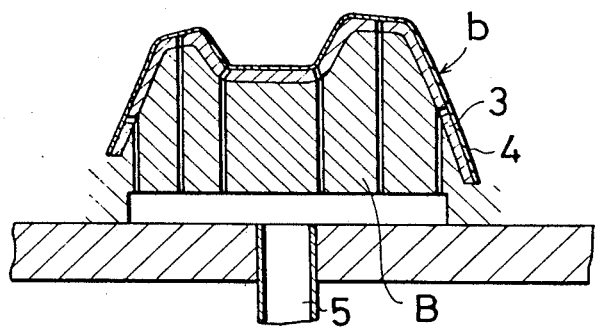
Figure 5:
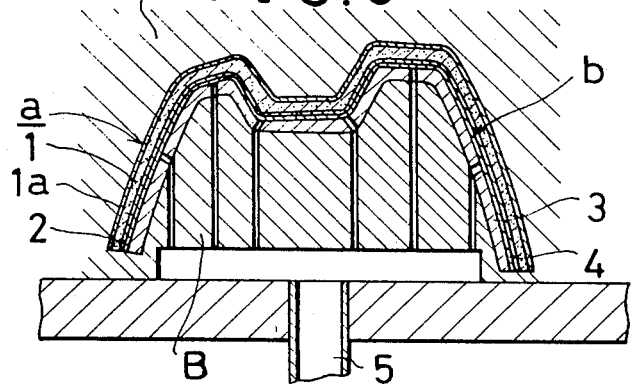
Figure 6:
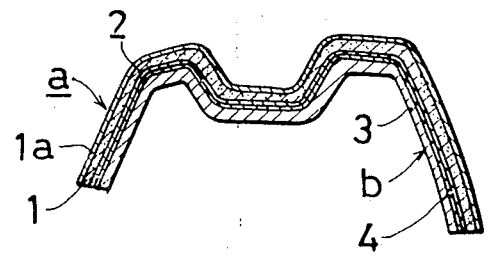

The panel 3 is coated, preferably with a cross-linking bonding agent of the same type as that used in the primer surface 2 of the foam sheeet 1, that is, the polyester bonding agent with the added cross-linking agent as used above, and is dried. Thereafter, the panel is heated and is placed on a lower male die B as shown in FIG. 4. Thereafter, the two dies A, B are closed as shown in FIG. 5, and the two members are pressed against each other, and the bonding agent completes its hardening by the cross-linking reaction. As a result, the facing surfaces of the two members a and b are firmly bonded together by the cross-linking reaction of the interposed bonding agent, and additionally, in this case, due to the fact that the bonding surface of the foam member sheet has been previously formed with the primer treatment surface 2, the bonding thereof with the hard base member panel becomes strong. Furthermore, the primer treatment surface 2 and the interposed bonding agent are composed of the same cross-linking bonding agent, so that the affinity between the two is extremely improved and a more intimate and stronger bondingv of the foam sheet with the hard base member panel 3 can be assured. The resultant product is shown in FIG. 6. Numeral. 5 in FIG. 3 denotes a conduit connected to a vacuum source.

The foam member sheet 1 is required to be heat-resistant, and the shet 1 may be made of cross-linked polypropylene foam, of a copolymer of ethylene and vinyl acetate, or of polyethylene or the like. The hard base member may be made either of thermoplastic or thermosetting resin and is not limited to a synthetic resin but may be made of fiber board of inorganic or organic fiber.

The laminate sheet a need not always be shaped prior to closing the two lies, and accordingly a modified operation may be carried out in which the laminate sheet a is mountd below the upper female die A in a flat sheet condition as shown in FIG. 3, and is formed into the predetermined shape on the constructional member b on the die B upon closing of the two dies A, B, as shown in FIG. 5.

Example 2

A laminate sheet is prepared by bonding together a polyvinyl chloride leather-like sheet of about 0.5 mm in thickness and a polypropylene foam sheet of about 4.0 mm in thickness. The reverse surface of the foam sheet is subjected to a primer treatment in whch a hot-melting type polyester bonding agent such as a saturated polyester with an added cross-linking agent such as an isocyanate is applied thereonto and is cross-linked and hardened by heating. The laminate sheet is then heated to about 150° C. and is mounted in a female die and shaped by vacuum shaping. A rigid base member panel made of ABS resin is molded to a predetermined shape and the upper surface thereof is coated uniformly over the entire extent thereof with a polyester bonding agent with an added cross-linking agent. The panel is then heated to about 50° C. and is placed on a male die.

Thereafter, the two dies are closed and the laminate sheet contacts the base member panel under a pressure of about 3–5 kgs/cm$^2$. A composite panel is then taken out from the dies. The composite panel thus obtained as a result of completion of the cross-linking of the bonding agent is thereafter subjected to trimming, drilling and other treatments to become an instrument panel product.

When this composite panel was subjected to a bonding strength test, the bonding strength between the foam sheet and the hard base member panel was so very strong that the foam sheet itself was broken.

Thus, according to this invention, the previously shaped foam member subjected to the primer treatment and the previously shaped rigid base member panel are contacted through the cross-linking type adhesive agent and are bonded together under pressure, so that a strong bonding is obtained between the heat-resistant foam member, such as polypropylene foam, and the rigid base member panel, such as ABS resin. Such strong bonding has hitherto been considered to be difficult to be obtained. The composite panel obtained by the invention is capable of shock-absorption and is usable as an instrument panel or the like and can be mass-produced.

In the specific embodiments set forth in the examples, the polyester bonding agent was such a saturated polyester dissolved in aromatic hydrocarbon solvent that is the ester resultant produced by reaction of one or more of diols and one or more of dicarboxylic acids and is 70°~100° C. in melting point and has 4~8 in OH value and 1~2 in acid value, and the cross-linking agent was one or more of a series of "Desmodurs" under the trade names of "Desmodur M", "Desmodur RF", "Desmodur R", "Desmodur TT". And there was used a cross-linking type hot-melting bonding agent prepared by mixing 100 parts, by weight, of the above polyester bonding agent and 5~15 parts, by weight of the above cross-linkiong agent.

Numerous modifications and variations of the bonding agent will be evident to those skilled in the art particularly where the polyester can be other substances while the cross-linking agent can be alternative isocyanates or polyisocyanates. The invention is intended to cover all equivalents and the breadth of the scope and spirit of the invention is defined by the attached claims.

What is claimed is:

1. A process of manufacturing a composite panel capable of shock absorption, said process comprising subjecting a surface of a polyolefin foam member to a primer treatment in which a polyester hot-melting bonding agent with an added isocyanate cross-linking agent is applied to said surface and is hardened by cross-linking thereof to form a primer treatment surface having no hot-melting adhesive properties, applying to one surface of a laminating member a cross-linking type hot-melting bonding agent, placing the treated surfaces of the foam member and laminating member in contact with one another, and bonding the two members together while treating and applying pressure thereto.

* * * * *